United States Patent
Yadav et al.

(10) Patent No.: US 9,043,284 B1
(45) Date of Patent: May 26, 2015

(54) RETENTION OF ACTIVE DATA STORED IN MEMORY

(75) Inventors: Sandeep Yadav, Santa Clara, CA (US);
John Edwards, Sunnyvale, CA (US);
David Crunwald, Santa Clara, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 13/541,466

(22) Filed: Jul. 3, 2012

Related U.S. Application Data

(60) Division of application No. 12/502,176, filed on Jul. 13, 2009, now Pat. No. 8,219,529, which is a continuation of application No. 11/394,431, filed on Apr. 1, 2006, now Pat. No. 7,562,078.

(51) Int. Cl.
*G06F 7/00* (2006.01)
*G06F 17/00* (2006.01)
*G06F 17/30* (2006.01)

(52) U.S. Cl.
CPC ................................ *G06F 17/30067* (2013.01)

(58) Field of Classification Search
CPC .......... G06F 17/30067; G06F 17/3007; G06F 17/30073; G06F 7/30088; G06F 17/30091
USPC ......... 707/609, 635, 639, 655, 656, 657, 658, 707/659, 660; 711/161, 162
See application file for complete search history.

(56) References Cited

U.S. PATENT DOCUMENTS

| | | | |
|---|---|---|---|
| 5,170,466 A | 12/1992 | Rogan et al. | |
| 5,301,350 A | 4/1994 | Rogan et al. | |
| 5,321,816 A | 6/1994 | Rogan et al. | |
| 6,035,297 A | 3/2000 | Van Huben et al. | |
| 6,088,693 A | 7/2000 | Van Huben et al. | |
| 6,094,654 A | 7/2000 | Van Huben et al. | |
| 7,181,437 B2 | 2/2007 | Indeck et al. | |
| 7,191,290 B1* | 3/2007 | Ackaouy et al. | 711/119 |
| 7,644,113 B2 | 1/2010 | Midgley et al. | |
| 2003/0182389 A1* | 9/2003 | Edwards | 709/213 |
| 2005/0097289 A1* | 5/2005 | Burton et al. | 711/162 |
| 2005/0210218 A1 | 9/2005 | Hoogerp | |
| 2006/0047932 A1* | 3/2006 | Anderson et al. | 711/162 |
| 2007/0067256 A1* | 3/2007 | Zayas et al. | 707/1 |
| 2007/0118704 A1* | 5/2007 | Sogabe | 711/162 |
| 2007/0255768 A1 | 11/2007 | Shitomi et al. | |

OTHER PUBLICATIONS

Iron Systems, Networks Storage, 2003, Google, pp. 1-4.
Kher Vishal, Kim Yongdae, "Security Distributed Storage: Challenges, Techniques and Systems", ACM, Nov. 11, 2005k pp. 9-25.

* cited by examiner

*Primary Examiner* — Hares Jami
(74) *Attorney, Agent, or Firm* — Gilliam IP PLLC

(57) ABSTRACT

A method and apparatus for retention of active data stored in memory using multiple indexing systems for data storage. An embodiment of a method for retention of active data in a storage server includes reading data into a first location of a main memory of the storage server. The data in the first location indexes data elements in a long-term data storage in a first manner. The method further provides for copying the data from the first location into a second location in the main memory of the storage server, where the data in the second location indexing the data elements in the long-term data storage in a second manner.

16 Claims, 12 Drawing Sheets

RETENTION OF ACTIVE DATA STORED IN MEMORY

This application is a divisional application of U.S. patent application Ser. No. 12/502,176, filed Jul. 13, 2009 now U.S. Pat. No. 8,219,529 which is a continuation of U.S. patent application Ser. No. 11/394,431, filed Apr. 1, 2006 which is now U.S. Pat. No. 7,562,078, which issued Jul. 14, 2009.

FIELD OF THE INVENTION

At least one embodiment of the present invention pertains to data storage, and more particularly, to a method and apparatus for retention of active data stored in memory using multiple indexing systems for data storage.

BACKGROUND

A storage server is a special-purpose processing system used to store and retrieve data on behalf of one or more client processing systems ("clients"). A file server is an example of a storage server. A file server operates on behalf of one or more clients to store and manage shared files in a set of mass storage devices, such as magnetic or optical storage based disks or tapes. The mass storage devices may be organized into one or more groups of Redundant Array of Inexpensive Disks (RAID). In a storage area network (SAN), a storage server can provide clients with block-level access to stored data, rather than file-level access. Some storage servers are capable of providing clients with both file-level access and block-level access, such as certain Filers produced by Network Appliance, Inc. of Sunnyvale, Calif.

In the operation of a storage server, including a file server, processes may include the generation of certain kinds of data storage images. Image generation may include mirroring, in which a mirror copy of certain data at one location is maintained at another location, snapshots of data storage, or clones of data storage volumes. Mirroring of data may be done for various different purposes. Mirroring provides one mechanism for ensuring data availability and minimizing down time, and may be used to provide disaster recovery. Providing a mirrored source in a geographically remote location allows continued data availability even in situations of widespread disasters or so-called "acts of God". In addition, snapshots provide point-in-time images of data, and clones generally provide a writeable image of data storage, which may be used for various purposes in data operations.

However, operations regarding data storage images can negatively affect system performance. In many operations, active data that is stored in memory may not be retained, and thus the data must be again read from memory. For example, a storage server containing mirrored data storage may include data buffers for data that has been read from the disk storage of the storage server into memory. The data buffers assist system performance because access from memory is generally significantly faster than reading such data from disk storage. When there is an update of the mirrored data storage, which may be referred to as a jumpahead point, the data held in main memory (i.e., random access memory (RAM) or other similar memory) may be lost. The update may be in response to, for example, a write to the mirrored data or a user initiated update. In at least one type of existing system, the memory of the storage server would be flushed. Upon reactivation of a destination volume after a mirroring update, such as in the remounting of the destination volume, any previously requested data that did exist in memory will need to be obtained from disk storage, because any previous data buffers would have been flushed from memory. The flushing of the memory removes previously read in-memory data and assists in avoiding corruption of data. However, active data, which is data that has recently been accessed by one or more clients, that has been read from disk into memory prior to the mirror update is also flushed out of memory and, if a client again requests this data after the mirror update, then the data needs to be read again from disk memory. Because disk storage is slower than access from memory, the result is delays in responses to data requests, which may lead to cascading of delays as operation queues increase in length. The delays will occur until the destination volume has recovered from the jumpahead and the memory again contains the cached data items that are needed to provide quick data responses. The additional time required to read such data from disk slows system performance, and may in some circumstances cause client application time outs.

SUMMARY OF THE INVENTION

An embodiment of the invention provides for retention of active data stored in memory using multiple indexing systems for data storage.

One aspect of the invention is a method for retention of active data in a storage server, which includes reading data into a first location of a main memory of the storage server. The data in the first location indexes data elements in a long-term data storage in a first manner. The method further provides for copying the data from the first location into a second location in the main memory of the storage server, where the data in the second location indexing the data elements in the long-term data storage in a second manner.

In another aspect of the invention, a storage server includes a memory, the memory including a container file for a storage volume. The memory also includes a data image of the storage volume. The storage server further includes a disk storage, the disk storage containing an aggregate storage of data elements for the storage volume. The container file indexes the data elements of the storage volume in a first manner and the data image indexes the data elements of the storage volume in a second manner. The storage volume includes a processor to manage the storage volume, where the processor is to move data elements in the image to the container file.

Other aspects of the invention will be apparent from the accompanying figures and from the detailed description that follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
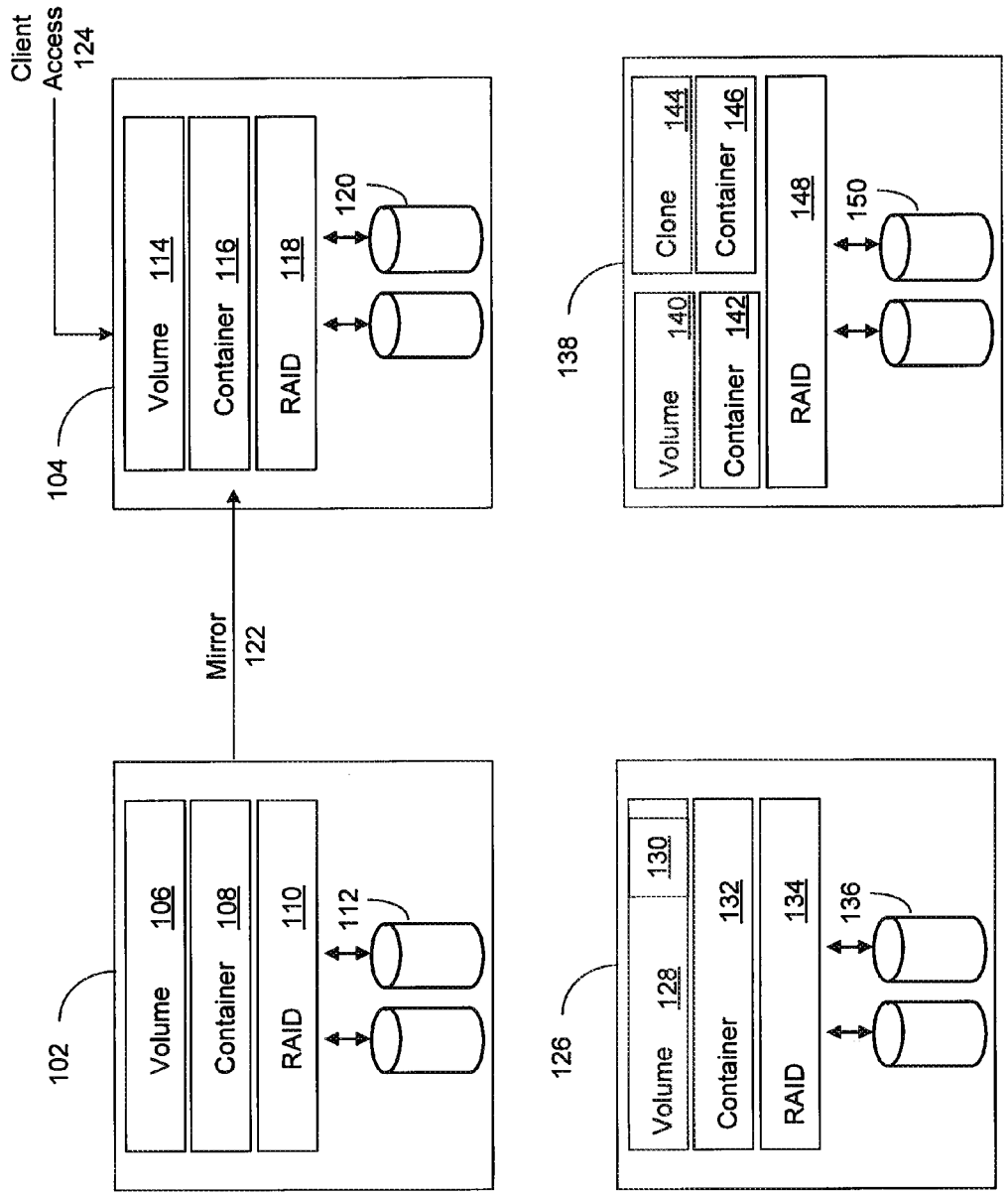
FIG. 1 illustrates the storage of data in an embodiment of the invention.

A method and apparatus are disclosed for retention of active data stored in memory using multiple indexing systems for data storage. In an embodiment of the invention, active data that is present in a location in a volatile memory (such as random access memory, or RAM) is indexed in a first manner to data that is stored in long-term data storage (non-volatile memory, such as a disk storage) is moved or copied to a second location in the volatile memory. The moved data is indexed in a second manner to the same data stored in the long-term storage. The data that was present in the first location is released or deleted, and is no longer available at this location. A third location is then provided for the data in the main memory, where the manner of indexing for data in the third location is the same as the manner of indexing for the first location, although the indexing values for the data might differ between the first location and the third location.

If a request for a data element is then received, there is a determination whether the requested data element is present in the third location. If so, then the data element can be provided in response to the request. If the data element is not present in the third location, there is then a determination whether the requested data element is present in the second location. If the data element is present in the second location, the data element is moved or copied from the second location to the third location to respond to the request, thereby avoiding the need to retrieve the data from the long-term storage. If the data element is not present in the third location, the data element is read from the long-term data storage into the third location to respond to the request.

The following are certain terms used in the description:

As used herein, "image" or "data image" means an image or copy generated of data storage. An image includes, but is not limited to a mirror of data storage, a snapshot of a storage volume, and a clone of a storage volume.

As used herein, a "mirror" is a duplicate copy of data that is present in another location. "Mirroring" is the process of replicating data to one or more devices, which may be done to, for example, protect against loss of data in the event of device failure or provide multiple locations to access the data. In one example, a mirror includes a volume that contains a read-only copy of data from the active file system of another volume. A mirror usually exists on a different physical device, such as a different storage server, to provide data security. A mirror may include, but is not limited to, data storage produced by SnapMirror® of Network Appliance, Inc.

As used herein, a "snapshot" is a point-in-time image of data. A snapshot includes a read-only, persistent, point-in-time image (PPI) of a data set, such as a volume or a logical unit number (LUN). A snapshot is intended to capture persistently the exact state of data in a data set at a point in time when the snapshot was taken. A snapshot includes, but is not limited to, a NetApp SnapShot™ of Network Appliance, Inc.

The term "snapshot" is used in this document without derogation of Network Appliance, Inc.'s trademark rights.

As used herein, a "clone" means a writeable copy of data. A clone includes a writeable copy of a storage volume. A clone may include, but is not limited to, a FlexClone™ of Network Appliance, Inc. The term "clone" is used in this document without derogation of Network Appliance, Inc.'s trademark rights.

As used here, "volume" or "storage volume" means a logical data set that is an abstraction of physical storage, combining one or more physical mass storage devices (e.g. disks) or parts thereof into a single logical storage object, and which is managed as a single administrative unit, such as a single file system. A volume may be defined from a larger group of available storage, such as an aggregate. The physical storage of a volume may vary in different implementations. For example, a volume referred to herein as a "flexible volume" is a volume that is flexibly associated with the underlying physical storage, while a "traditional volume" is a volume that is mapped directly and inflexibly to the underlying physical storage. A flexible volume includes a file structure to support the data storage, which is referred to herein as a container file, including a buffer tree. In a storage server that implements flexible volumes, an aggregate is actually represented (implemented) as a volume in the storage server, and each volume in that aggregate is represented (implemented) as a file in the related aggregate.

As used herein, an "aggregate" or "aggregate storage" is a logical aggregation of physical data storage. An aggregate may be a logical container for a pool of storage, combining one or more physical mass storage devices (e.g., disks) or parts thereof into a single logical storage object, which contains or provides storage for one or more other logical data sets at a higher level of abstraction (e.g., volumes). An aggregate may hold zero or more "flexible volumes" that are flexibly mapped to the storage provided by the aggregate.

As used herein, a "container file" is a file that supports a volume. A container file is generally an internal feature to an aggregate that is hidden to a user, and that holds every block in use by the volume. The container file defines an indexing of the data in aggregate using virtual block numbers (as opposed to the actual physical addresses of stored data). In an example, the container file may include level 0 (L0) data blocks that comprise all blocks used to hold data in the volume, and level 1 (L1) and higher indirect blocks of the container file residing in the aggregate.

"Buffer tree" (or "buftree") means a hierarchical metadata structure (for example, a linked list) used by a file system to keep track of the locations of the data blocks of files, with the root (top level) of each file being the inode of the file. As used herein, an "inode" refers to a metadata structure which is used to store metadata about a file, such as ownership of the file, access permission for the file, size of the file, file type, and pointers used to locate the data blocks for the file. A buffer tree includes a buffer tree of a container file.

As used here, "mount" means to make a file system on a particular device accessible by attaching the file system to the device's file hierarchy. Similarly, "unmount" means to make a file system on a device inaccessible by detaching the file system from the file hierarchy, and "remount" means to reattach the file system to the device's file hierarchy and thus return the accessibility of the file system. As used here, "file system" means any organization of data in a structured manner, including, but not limited to, traditional file systems and other data storage.

In an embodiment of the invention, active data is stored in a volatile memory in a first location, the first location acting as a cache memory for the data. The data is retained in memory by moving the data to a second location in the volatile memory. In an embodiment of the invention, the copying or moving of data may include the moving or copying of references to data elements, rather than the copying or moving of the data elements themselves. In an embodiment, the data is indexed to data in long-term storage in a first manner in the first location and is indexed to the same data in the long-term storage in a second manner in the second location. In an embodiment of the invention, the data can be retrieved from the second location when there is a request for such data, thereby avoiding the need to access the data in the long-term storage.

In a data storage, such as a disk storage, data may be indexed in numerous ways for different purposes and different types of images. For example, the data storage may include a volume, with the volume having a particular virtual indexing method to relate to the data stored in disk storage. The indexing may be provided by a container file that supports the volume. However, in addition certain other images of the data may be present in volatile memory, with these images including data mirrors, snapshots, and clones of the data. However, the indexing for the volume and the indexing for a data image may both relate to the same shared blocks in the disk storage. In an embodiment of the invention, the different indexing formats or systems for the data may be used to retain active data in volatile memory that would otherwise be lost, and thus would need to be retrieved from the disk storage. In one embodiment of the invention, data is moved from a first location for a data image to a second location for the container file of the volume. The data relates to the same data that is stored in disk storage, but is now indexed in a different manner from the first manner.

The actual indexing systems or formats that are used may vary in different embodiments. For example, the indexing of data in a first manner may include indexing by the volume ID, snapshot ID, file ID, and file block number for the stored data. The indexing of data in a second manner may include indexing by a virtual indexing structure using virtual block numbers, including, but not limited to, volume block numbers.

In an embodiment of the invention, after data has been copied or moved from a first (data image) location in memory to a second (container file) location, the data that was present in the first location is released and is no longer available. A third location for the data is generated, and a request for the relevant data would be directed to the third location. In an embodiment of the invention, if a request for one of the data elements is received, then a determination is made whether the data is already present, or cached, in the third location, such as when the data has been recently requested and is still contained in memory. If a determination is made that the data is not present in the third location, then the data needs to be retrieved. In an embodiment, there then is a determination whether the data is present in the second container file location. If so, then the data can be copied or moved from the container file into the third location, thus making the data available for the response without reading the data from the disk storage, which is generally a significantly slower process. If the data is not in the container file, for example when the data has not been moved in a previous action, then the data is read from the disk storage in the conventional manner.

In an embodiment of the invention, the copying or moving of data from a first location to a second location may include a determination whether any data element in the first location is connected with a direct write to the container file (or other similar file) or to the underlying long-term data storage. If there has been a direct write, then the data element in the first location is no longer valid and thus should not be copied or moved to the location. In one example, a direct write to a container file or to the data storage may be detected by comparing the relevant volume block number for the active data with the volume number that is referenced by the container file. If such numbers do not match, then the data is deemed to be invalid and is not written to the second location.

In one embodiment of the invention, a storage server may contain certain data for which a data image is generated. The image may include data that is mirrored or replicated from the storage server (which may be refetrred to herein as a "source storage server") to another storage server (which may be referred to herein as a "mirror storage server" or a "destination storage server"). The image may also include, for example, a snapshot of the storage server or a clone of a storage volume. In each such case, the data for the data image relates to data stored in disk storage, and will share data blocks with other images and with the volume itself. In the process of accessing the data images, such as in the process or updating the replication of data to the destination storage server for a mirror image or in an operation relating to a snapshot or clone, active data buffers (data in a first location) are moved to a container file buffer tree (a second location) of the destination storage server. In an embodiment of the invention, subsequent client requests may be served by fetching the data buffers from the container file buffer tree (thereby moving or copying the data to a third location for use).

In a particular example of a mirroring operation, a source volume in a source storage server is replicated in a destination volume in a destination storage server. The destination volume provides a read-only copy of the source volume, which is updated at certain times with changes from the source volume. (While this example uses a single destination volume, the mirroring process may include replication of data to multiple destination volumes.) The destination volume may be used to serve data requests received from clients. In the service of such requests, data may be read from memory (i.e., the main memory of the destination storage server, which is generally a form of RAM) in response to requests, and such active data may be retained or cached in data buffers in memory to quickly serve subsequent requests.

However, in existing installations, the data buffers in the main (volatile) memory would be eliminated when the mirrored or replicated data is updated. In an existing system, when a mirror reaches a jumpahead point, the existing data in memory is eliminated. For example, a destination volume may be unmounted and remounted in order to flush in-memory data and to serve subsequent client requests from disk. The process of unmounting the destination volume assists in avoiding data corruption, but also serves to flush active data that was already read into memory prior to the mirror update. The unmounting of destination volume invalidates all of the in-memory inodes and buffer trees of data, as well as any metadata in memory that is associated with the volume.

In an embodiment of the invention, a destination volume is a flexible volume or similar volume that includes a buffer tree of a container file or similar file structure (a second memory location) that is not invalidated in the unmounting of the destination volume, and thus may be used to retain data buffers in mirror updates. In an embodiment of the invention, the data structure of the destination volume is used to provide a location in memory for active data such that the active data is not lost in mirror update processes. Active data buffers are moved or copied to the container file buffer tree or similar data structure for the destination volume to prevent the flushing or other loss of such data. In one example, any in-memory data buffers of a destination volume are moved or copied to the destination volume's container file buffer tree at the mirror update jumpahead. The container file, which supports the operation of a flexible volume, is not flushed when the destination volume is unmounted, and thus data buffers that are moved to the container file buffer tree will not be flushed from memory. In this embodiment, a location for the flushed data is generated in the main memory after the flushing of data. A subsequent client request may be served by fetching the data buffers from the container file buffer tree in memory, rather than reading such data from disk. The system performance may thus be enhanced by reducing the disk access on client read requests.

In an embodiment of the invention, a mirrored storage server may include a process that operates as follows:

(1) A mirror update, or jumpahead, point is reached in which the data in a destination volume is to be updated.

(2) As a part of the update process, the destination volume will be removed from the file hierarchy of the destination storage server (unmounted) to invalidate any data currently held in memory. Data in memory may include active data that has been requested by one or more clients, which generally would be cached in memory to serve future data requests. The cached data will be released in the unmounting process.

(3) Prior to unmounting the destination volume, the data buffers of the volume, representing the in-memory data that was read from disk memory for any client before the mirror update event, are moved or copied to a file structure, such as the container file of the destination volume.

(4) The destination volume is unmounted, thereby invalidating all in-memory data buffers and unloading all inodes, with the exception of the inode of the container file of the destination volume. In this manner, the data that was contained in the main memory is released, but the data contained in the container file is retained.

(5) The destination volume is remounted to the file hierarchy, and the metafiles of volume are reloaded. The container file does not require reloading because it was not unloaded at the time of the unmounting of the destination volume.

(6) When a client subsequently requests data from the destination server, there is first a check to determine whether the data is present in the in-memory buffer tree of the destination volume's container file. If the data is present in the container file's buffer tree, then the data is moved or copied from the container file's buffer tree to main memory and served to the client. If the data is not contained in the container file's buffer tree, then normal operation of reading the data from disk is followed, with an in-memory buffer tree of an inode for the requested data being prepared so that the data is retained in memory for future requests.

In another embodiment of the invention, a different type of data image may be generated. The data image may include a snapshot of the volume, the snapshot representing a point in time image of the volume, or a clone of the volume, the clone representing a writeable copy of the volume. The data image again shares the data blocks of the volume, and thus provides an indexing method or scheme for the data in the volume that may be used to retain the data. A container file again presents another indexing method or scheme for such data. In an embodiment of the invention, upon generation of a data image, the data relating to such data image may be pushed onto the buffer tree of the container file for the volume. The container file allows the retention of such data, which thus be used in subsequent processes, including the generation of additional data images.

FIG. 1 illustrates the storage of data in an embodiment of the invention. The data may be included in a data mirror for the mirroring of data from one storage server to another storage server under an embodiment of the invention, or in one or more snapshots and clones of a storage volume. In one example, the data on a first storage server 102 is mirrored to a second storage server 104. In this illustration, the second storage server 104 provides client access 124 to data. The first storage sever 102 contains a volume 106 with a container file 108, and a RAID system 108 providing access to disk storage 110. The second storage sever 104 similarly contains a volume 114 having a container file 116 and a RAID system 118 providing access to disk storage 120. The first storage server 102 and the second storage server 104 are flexible volumes that thus include virtual file structures. A mirror process 122 maintains the data in the second storage server 104 as a mirror copy of the data in the first storage server 102. However, periodically the mirrored data is updated, and at this jumpahead point the destination volume 114 is unmounted to eliminate data that may be held in main memory. During operation, a client may have accessed certain data, which thus is cached in memory to increase the efficiency of operation. However, when the mirror update occurs, this active data held in memory is also lost, thus requiring that such active data again be read from disk memory 120 when there is a request for the data.

Similarly, a storage server 126 may include a volume 128 with container file 132 together with a RAID system for access to disk storage 136. The volume may include one more snapshots 130 of the volume, each of which shares data blocks if the data is common. In another example, a storage server 138 may include a volume 140 with container file 142 together with a RAID system 148 for access to disk storage 150. The server may include one or more clones 144 and with associated container files 146, providing writable images of the volume. In a conventional operation, the data for the snapshot or clone would be released from memory upon deletion of the snapshot or clone. In an embodiment of the invention, the data for a snapshot, clone or other data image is pushed onto the container file, which thus retains such data so that it is available for later data requests.

Figure 2:
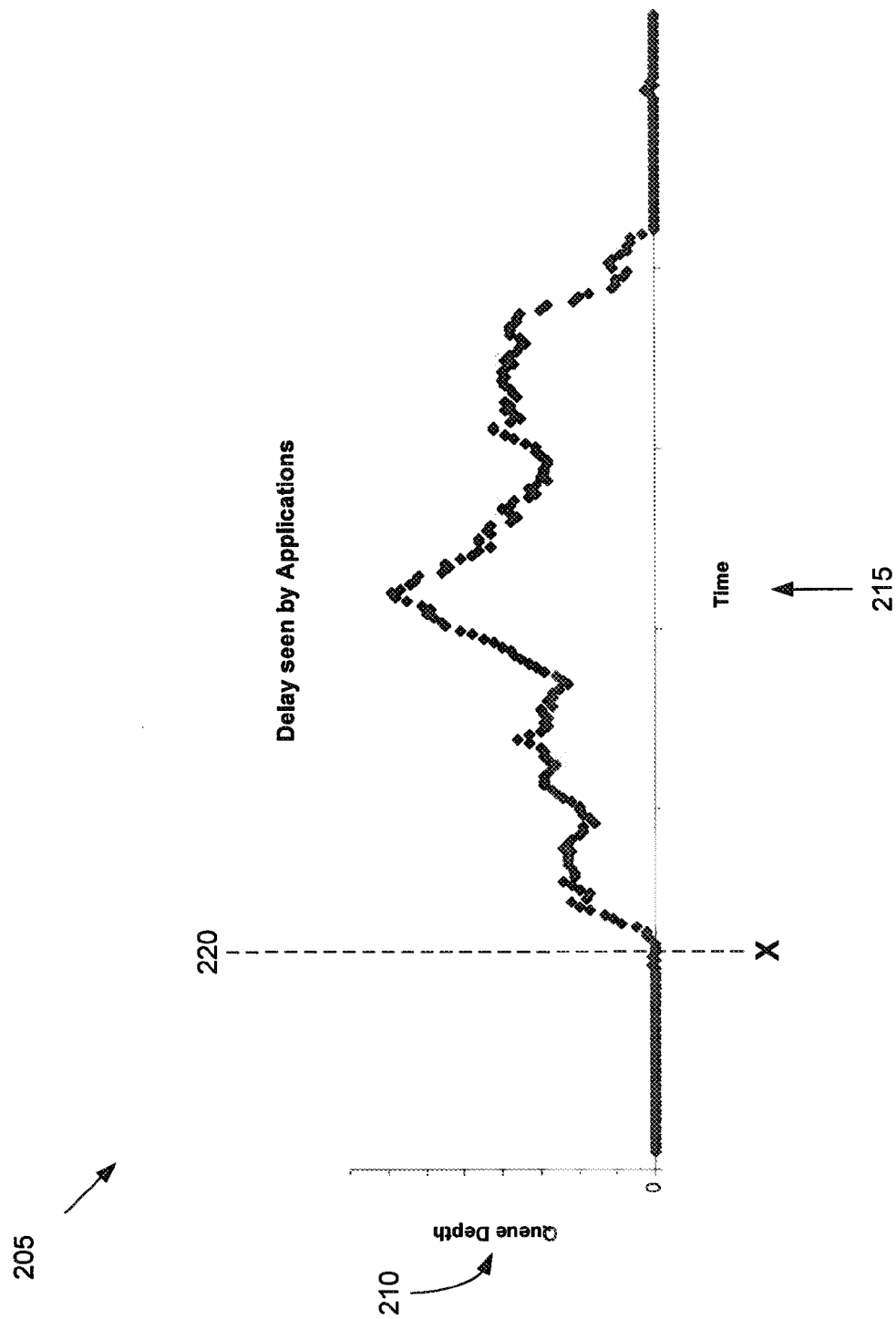
FIG. 2 is a graph to illustrate an example of the effect of mirror updates on delay for applications.

FIG. 2 is a graph to illustrate an example of the effect of mirror updates on delay for applications. In this graph 205, the queue depth 210, reflecting the number of operations that are waiting to be executed, is illustrated against time 215. In this illustration, a jumpahead point 220 occurs at a time X. As seen, there is minimal queue depth prior to the jumpahead point 220. However, after the jumpahead point 220 there may be a period of delays that builds up and eventually dissipates, which can be seen by the queue depth that increases up to some maximum and then is reduced as the effect of the mirror update is reduced.

The increase in queue depth is at least in part due to the loss of active data that was held in memory prior to the jumpahead point because such data then is read from disk memory, with a resulting significant increase in access time, until the memory cache recovers and again contains the appropriate data for operation. In an embodiment of the invention, the delays seen by applications are reduced by retaining the active data held in memory at the jumpahead point. In an embodiment of the invention, the active data is stored in the file structure of the mirror volume prior to the jumpahead and are then read from the file structure when required, which provides a significantly faster access process in comparison with the disk access that would be otherwise required.

Figure 3:
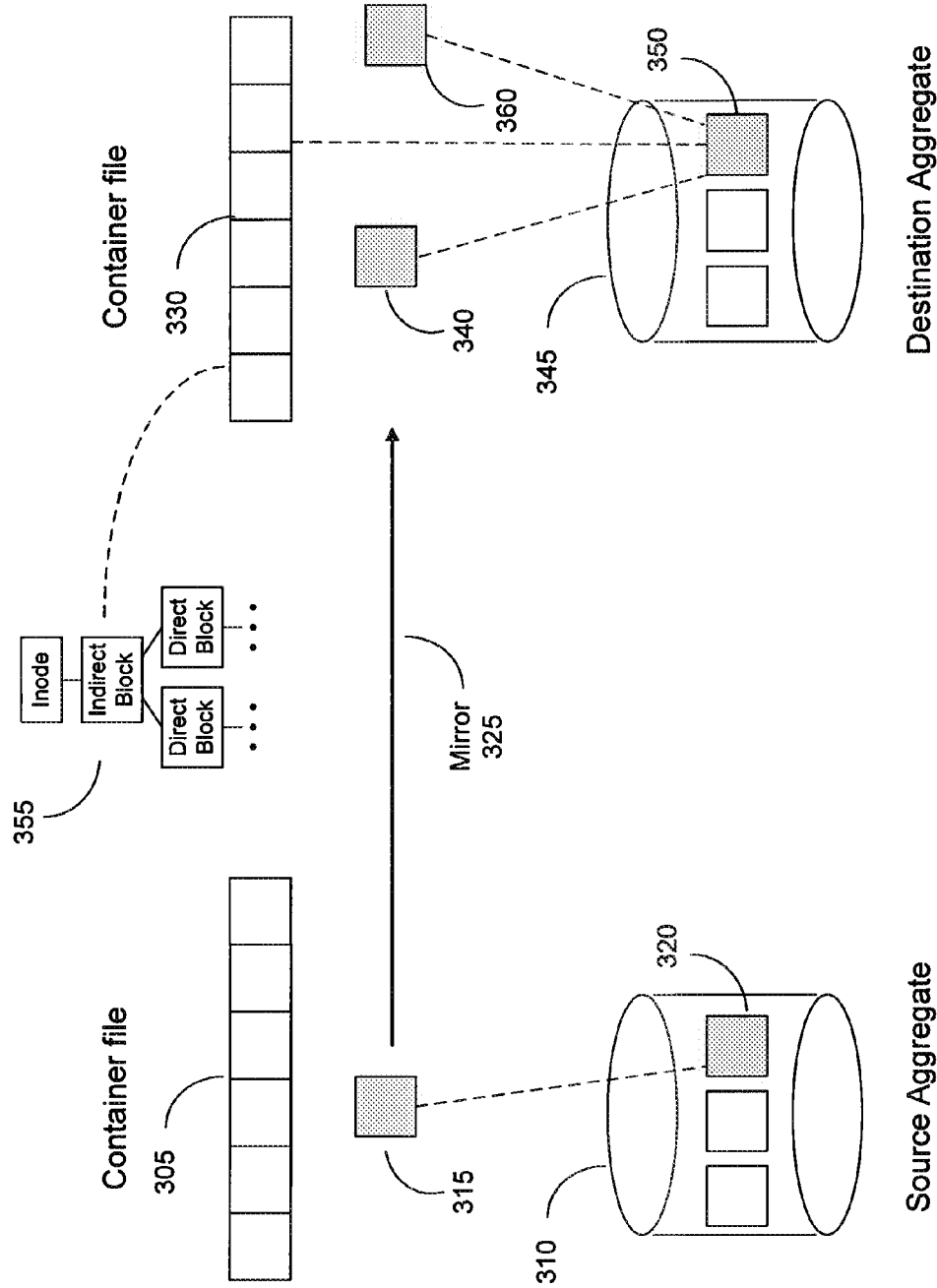
FIG. 3 is an illustration of data image processes in storage servers according to an embodiment of the invention.

FIG. 3 is an illustration of data image processes in storage servers according to an embodiment of the invention. In this illustration, a first container file 305, representing the file structure for a first volume, and a second container file 330, representing the file structure for a second volume, are shown. In an example, a data element 315 is stored in a first disk storage 310, resulting in the stored data element 320. A "data element" in this context is the smallest-sized unit of data that the file system manager of the storage server can individually see and manipulate. In certain embodiments, for example, a data element is a 4 Kbyte block of data, although in other embodiments it could be of a different size. The data element 315 then is mirrored 325, resulting in the replicated data element 340. The mirrored data element 340 is stored in a second disk storage 345, which is shown as stored data element 350. Thus, the mirrored data element 340 is stored in a first location in memory.

For the mirror process 325, there is periodically an update point, at which the replicated data is updated. However, the update point may result in the loss of active data that is being accessed from the second storage server because the data in memory is flushed as a part of the update process. In an embodiment of the invention, active data is stored in a buffer tree (illustrated as 355) for the second container file 330, which allows retention of such data because the buffer tree 355 of the container file 330 is not flushed from memory in an unmounting of the volume or other release of data from the memory. A buffer tree 355 provides a linked list of indirect and direct inode data blocks for the container file, and the data blocks in turn point to file data blocks on the disks (the aggregate 345) that comprise the file system. However, the data element 340 is indexed to the same shared data elements 350. Further, another data image 360 may point to the same data. Because of the sharing of the data blocks, the data can be moved or copied to the container file 330 to allow retention of the data that would otherwise be released. In an embodiment of the invention, if there have been no direct writes to the container file 330 that would invalidate the active data in memory 340, then the data is pushed into the buffer tree 355 of the container file 330.

Figure 4:
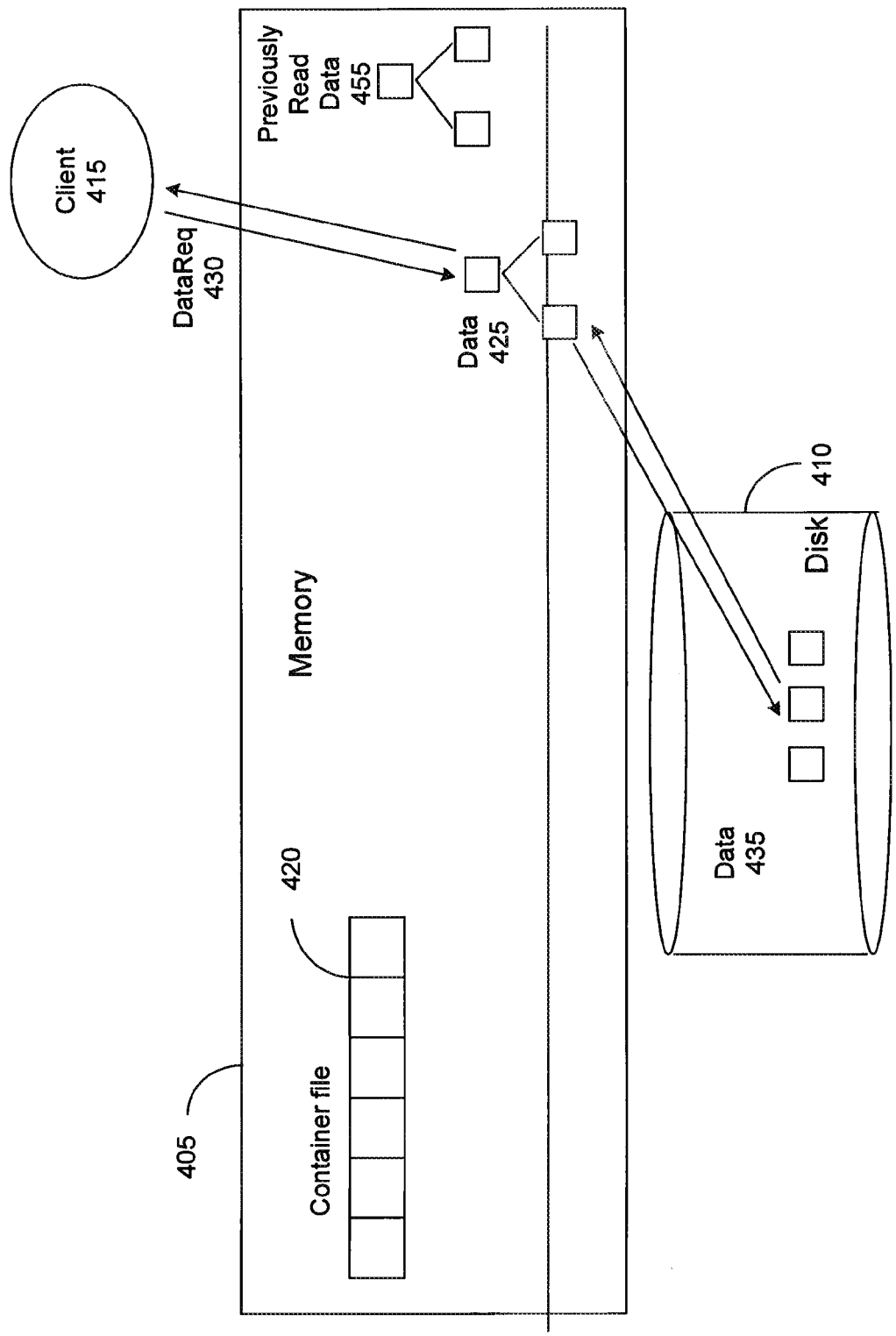
FIG. 4 is an illustration of data transfers in a destination storage server in an embodiment of the invention.

FIG. 4 is an illustration of data transfers in a storage server in an embodiment of the invention. In this illustration, the memory 405 of a storage server is shown. The memory 405 includes a container file 420 for a volume, the container file 420 indexing all data in a disk storage 410. The memory 405 will include certain data in a first location 425, which may represent a data image that has been generated. The data 425 in the first location also indexes to the data in the disk storage.

The memory 405 may be accessed to provide data to a client 415. For example, FIG. 4 illustrates the client 415 making data requests 430 to access the data 425, which has been read at this point or at an earlier time from the data stored 435 on the disk storage 410. However, in addition to illustrated active data 425 the memory 405 may contain certain previously read data 455 from prior transactions, which is not needed and may be invalidated from memory. In one example, if the volume is updated in a mirror operation from a source volume, the volume is unmounted from the file hierarchy of the server, thereby eliminating the data contained in memory. However, in addition to eliminating the previously read data in memory 455, the active data 425 would also be eliminated from memory, thus normally requiring that the stored data 435 be read from disk storage 410 if there is a request for this data. In an embodiment of the invention, the buffer tree of the container file 420 is used to retain the active data 425 (such as during the unmounting and remounting process in the mirror update), while allowing the previously read data to be eliminated.

Figure 5:
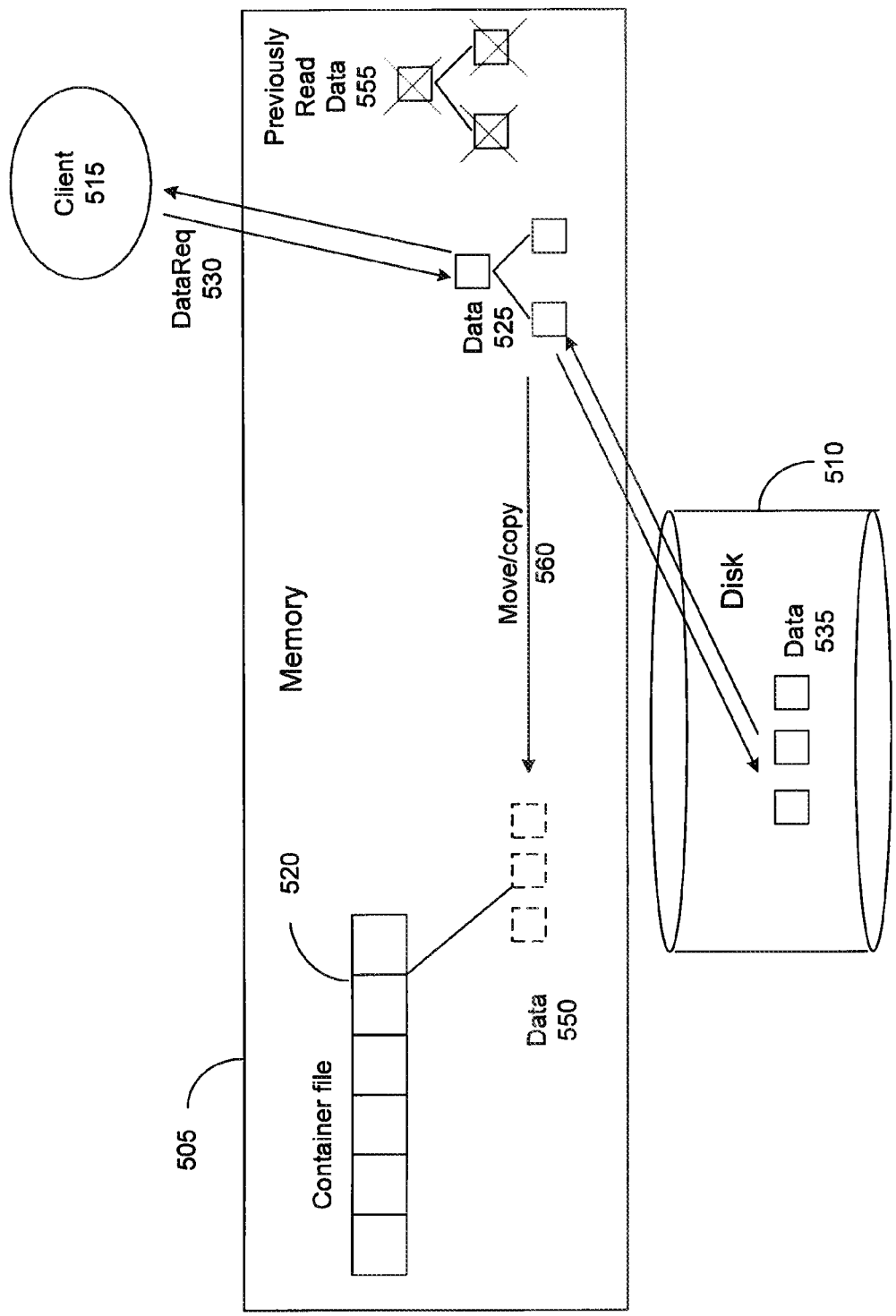
FIG. 5 is an illustration of storage of active data in an embodiment of the invention.

FIG. 5 is an illustration of storage of active data in an embodiment of the invention. In this illustration, the memory 505 of a storage server is again shown, including a container file 520 for a volume. The memory 505 accessed by a client 515. In this example, the client 515 has made a data request 530 to access certain active data 525, which has been read at this point or at an earlier time from the data stored 535 on the disk storage 510.

If the volume is updated from a source volume in a mirror operation, the volume will be unmounted from the file hierarchy of the server, thereby eliminating the data contained in memory. Further, the active data 525 may be lost when a data image is deleted. However, to prevent the loss of active data 525, prior to unmounting the file hierarchy the data 525 is moved or copied 560 from its current location in memory (a first location) to the buffer tree of the container file 520 (a second location), shown as the storage of data elements 550. The buffer tree of the container file 520 will not be invalidated in the unmounting process and thus the data copied to the buffer tree will remain accessible. After the storage of the data, the unmounting process continues, thereby flushing the data remaining in the memory 505, including previously read data 555 that should be eliminated to prevent possible data corruption.

Figure 6:
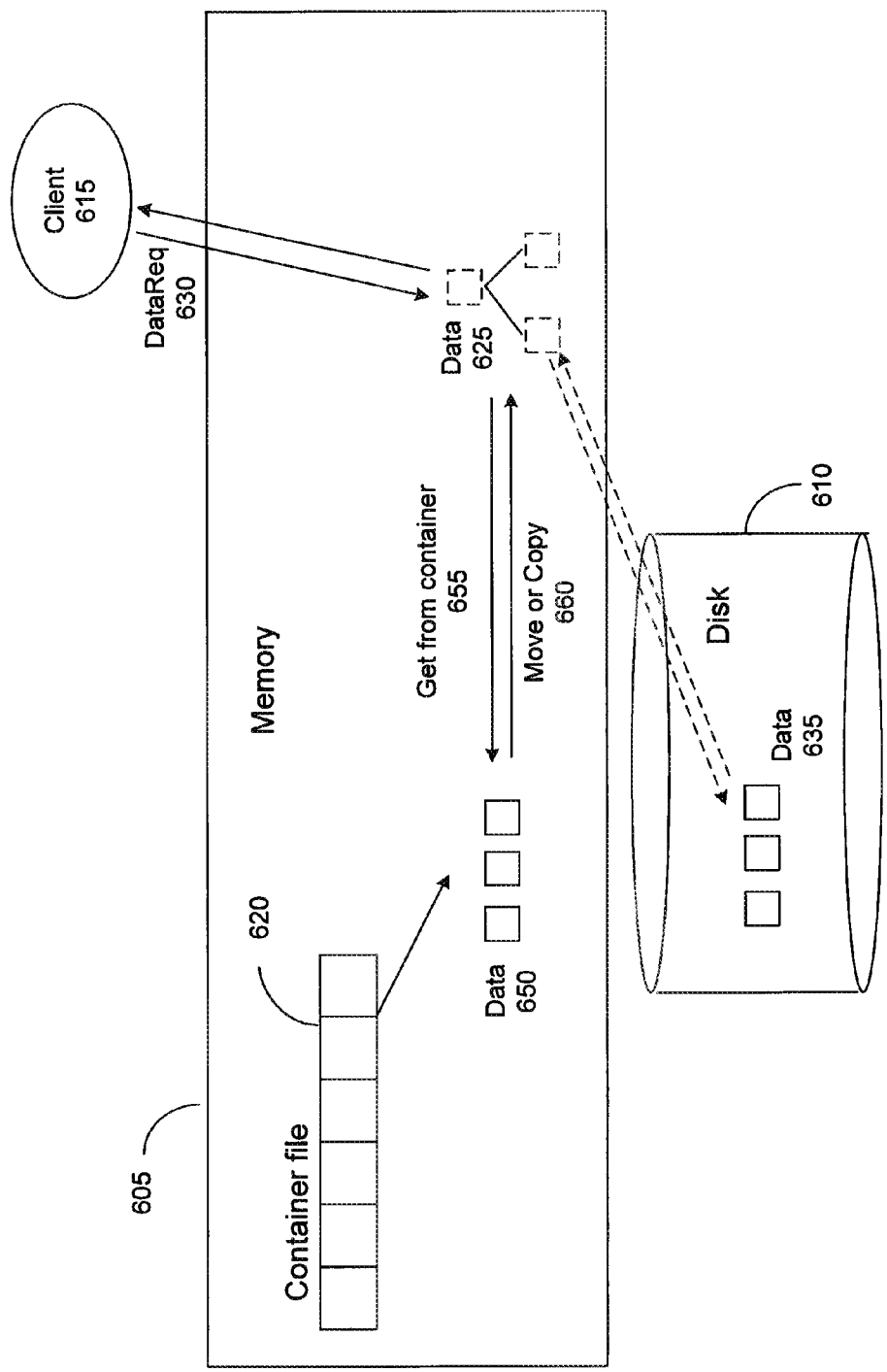
FIG. 6 is an illustration of retrieval of stored data in an embodiment of the invention.

FIG. 6 is an illustration of retrieval of stored data in an embodiment of the invention. In this illustration, the memory 605 of a storage server is again shown, including a container file 620 for a volume. In one example, the memory 605 may be accessed by a client 615, or there may be another type of access to the memory 605. In this example, the client 615 makes a data request 630 to access certain data 625, but the appropriate data buffer is not present in the memory because the data has been flushed from memory during a mirror update. In an embodiment of the invention, a location (a third location) has been generated for the data 625, but the location may not currently contain the data that is requested.

When it is determined that the required data buffer is not present, there is a check of the buffer tree of the container file 620 to determine whether a data buffer has been stored here and thus that the data is present. In that case, the data 650 is obtained from the container file 655, is copied or moved to the third location as data 625, and is provided to the client 615. The data then is available in memory 605 for future data requests from clients. If the data is not present in the container file 620, the data 635 can be read from disk storage 610, as in conventional operations.

Figure 7:
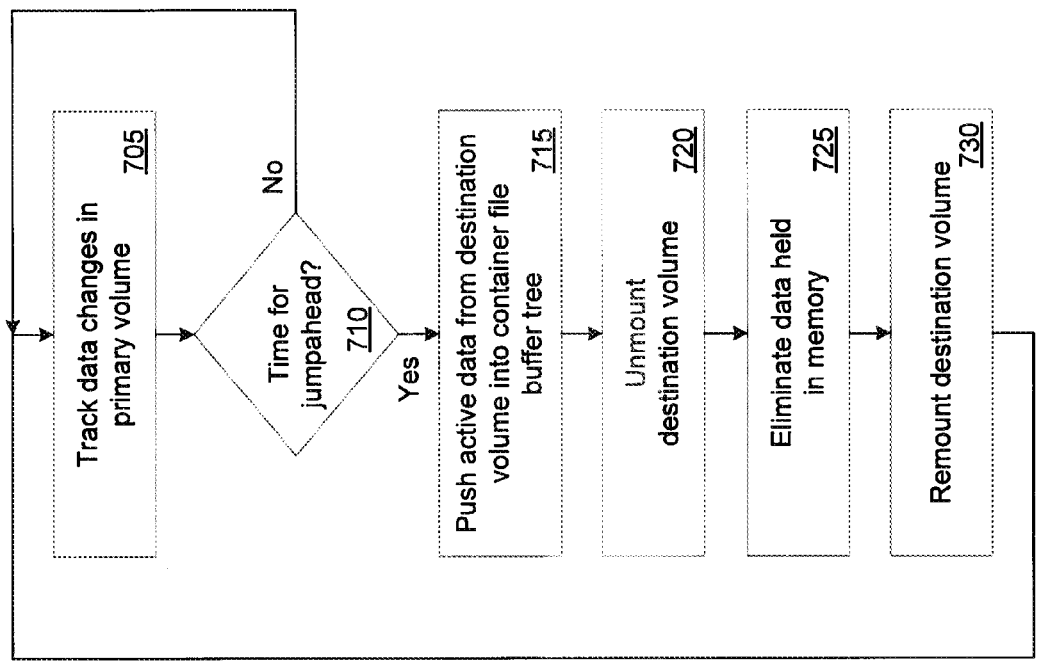
FIG. 7 is a flowchart to illustrate a data mirroring process that retains active data in memory.

FIG. 7 is a flowchart to illustrate a data mirroring process that retains active data in memory. FIG. 7 illustrates an embodiment of a process for storage of active data to allow retention in data mirror updates. In FIG. 7, any changes in the data of a volume of a source storage server is tracked or saved 705 to allow a mirroring of the data in a volume of a destination storage server. In an embodiment, the mirroring process will at certain points in time update the destination storage server at a jumpahead point. If it is time for a jumpahead 710, any active data from the destination volume (which is stored in a first location in volatile memory) is stored in a file structure for the destination volume 715 (a second location in volatile memory), such as in the buffer tree of the container file for the destination volume.

As illustrated, the destination volume is then unmounted 720, which disconnects such data from the file hierarchy and thus releases such data from storage 725. The volume of the destination storage server is then remounted 730, which results in restoring metadata for the volume and restoring client access.

Figure 8:
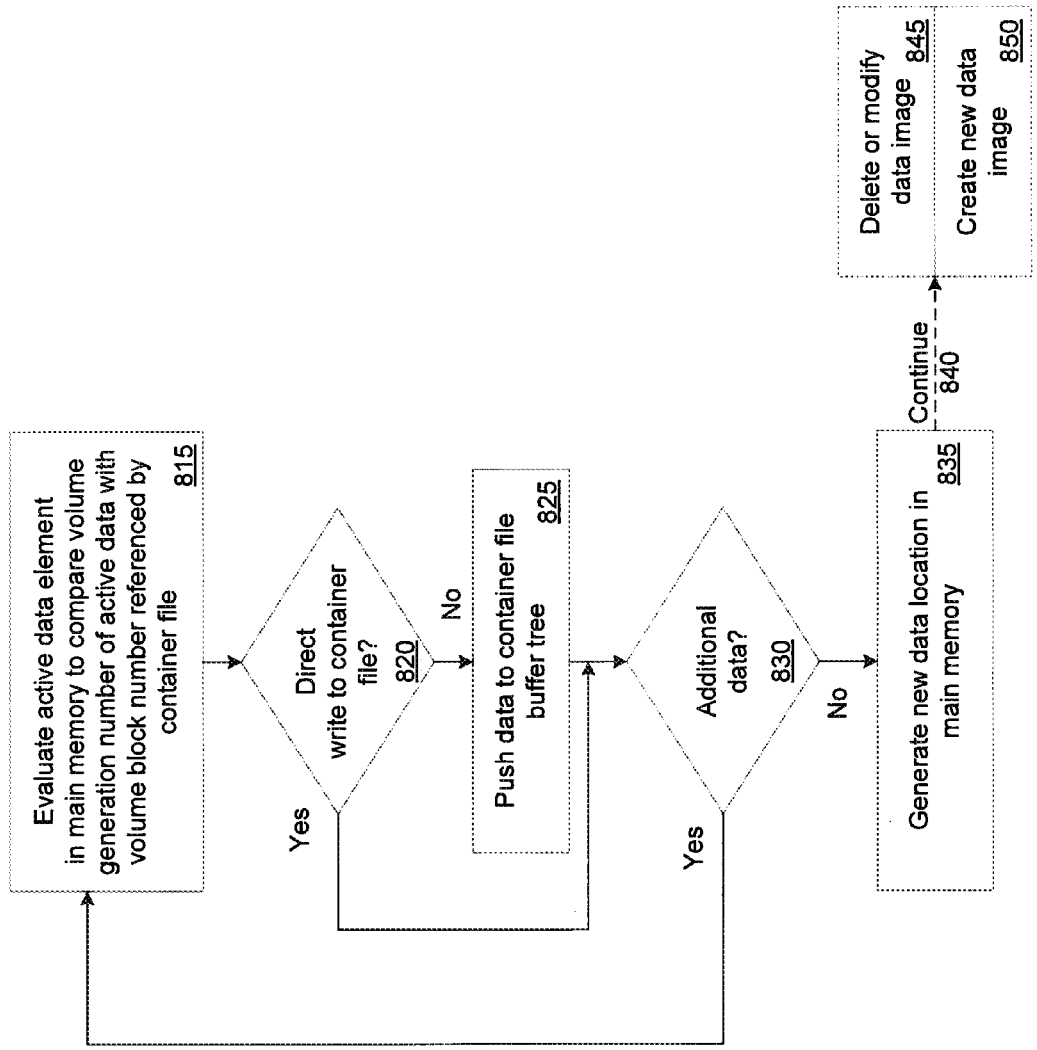
FIG. 8 is a flowchart to illustrate a process for retaining data read into main memory of a storage server.

FIG. 8 is a flowchart to illustrate a process for retaining data read into main memory of a storage server. In order to retain data in memory, each active data element in main memory is evaluated 815. In an embodiment, the volume block number of the active data (which may be referred to as a "generation number" that changes as writes occur) is compared with the volume number that is referenced by the container file. If the generation number and the volume number referenced by the container file do not match, this indicates that a direct write to the container file has occurred, thus invalidating the data element. If the numbers do match and thus there has not been a direct write to the container file invalidating such data element 820, the data is pushed into the buffer tree of the container file for the relevant volume 825. If there has been a direct write to the container file, then the data is not valid, and thus this data is not written to the container file. There may be a continuing determination whether there are other data elements to be evaluated in this same matter 830.

After the appropriate data has been pushed to the buffer tree of the container file, a location for the data is then generated in the memory 835 (a third location for the data). The location may represent a data buffer for the data. The operation of the storage server then continues 840. For example, the data image may be deleted 845 and/or a new data image may be generated 850. In an embodiment of the invention, the data that was pushed onto the buffer tree of the container file may be used to more efficiently address data requests or the generation of new data images.

Figure 9:
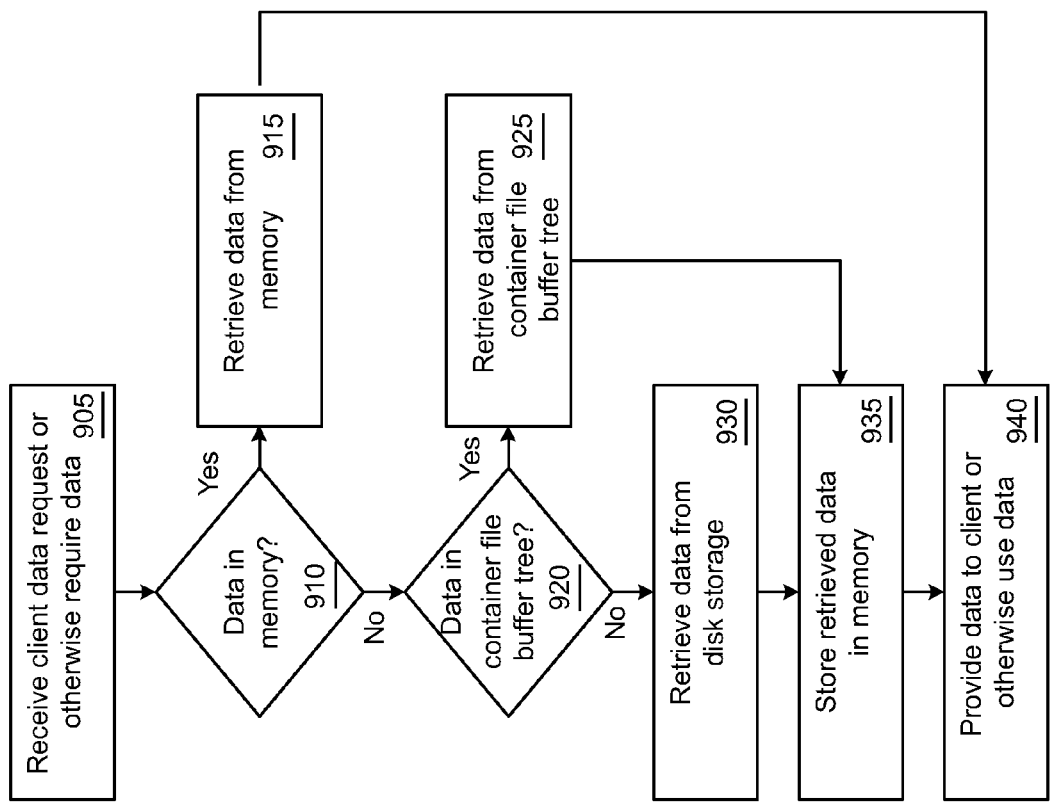
FIG. 9 illustrates an embodiment of a process for obtaining retained data in response to a request.

FIG. 9 illustrates an embodiment of a process for obtaining retained data in response to a request. In this illustration, a data request is received from a client or the data is otherwise required 905. There is a determination whether the data is currently in memory 910 (the third location for the data). If so, the data is retrieved from memory 915 and may be provided to the client or otherwise be used 940. If the data is not currently in memory, then there is determination whether the data has been stored in the buffer tree of the container file 920 (the second location for the data). If so, then the data is retrieved from the buffer tree of the container file 925, stored in the memory 935 for use in future data requests, and provided to the client or otherwise used 940. If the data is not in the buffer tree of the container file, then it is necessary to retrieve the data from disk storage 930, followed by storing the data in the memory 935 for further data requests, and providing the data to the client or otherwise making use of the data 940.

Figure 10:
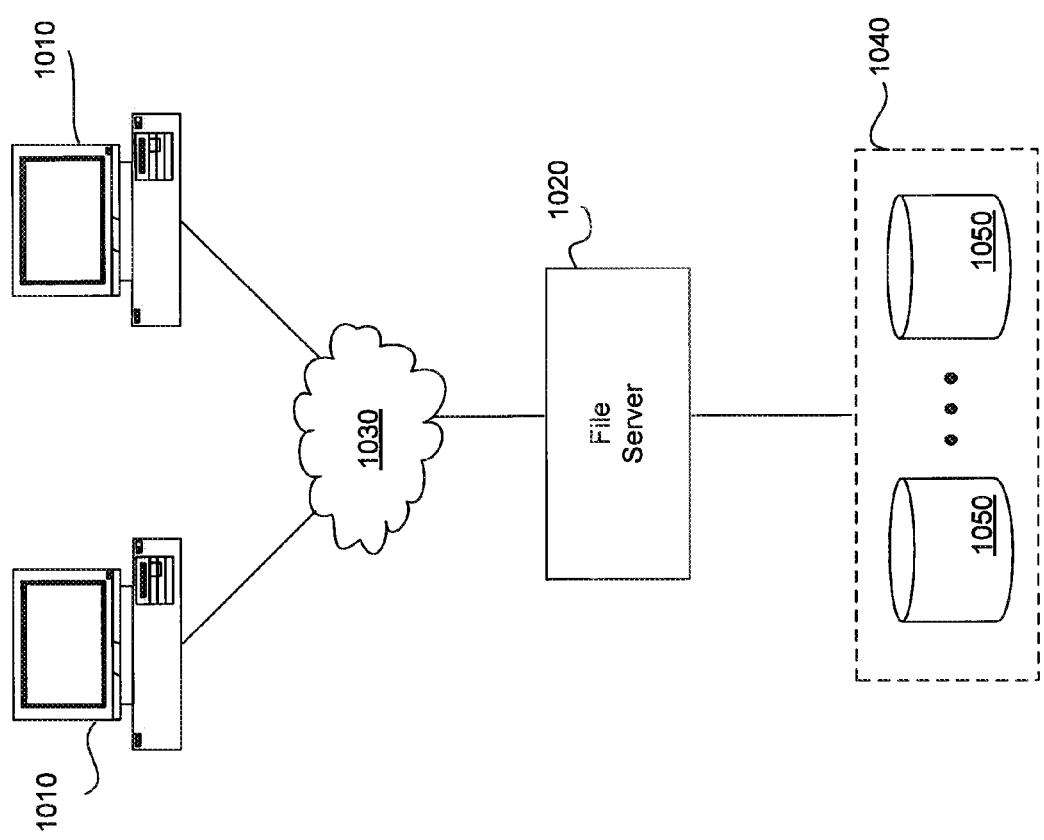
FIG. 10 is an illustration of a network environment in which an embodiment of the invention may be implemented.

FIG. 10 is an illustration of a network environment in which an embodiment of the invention may be implemented. However, embodiments of the invention are not limited to any particular environment, and may be implemented in various storage processes. In this illustration, the storage system includes a storage server, such as a file server 1020. The file server 1020 is coupled with a storage subsystem 1040, which includes a set of mass storage devices 1050, and to a set of clients 1010 through a network 1030, such as a local area network (LAN) or other type of network. Each of the clients 1010 may be, for example, a conventional personal computer (PC), workstation, or the like. Storage subsystem 1040 is managed by the file server 1020. For example, the file server 1020 may receive and respond to various read and write requests from the clients 1010, directed to data stored in or to be stored in storage subsystem 1040. The mass storage devices 1050 in storage subsystem 1040 may be, for example, conventional magnetic disks, optical disks such as compact disks-read only memory (CD-ROM) or digital versatile/video disks (DVD) based storage, magneto-optical (MO) storage, or any other type of non-volatile storage devices suitable for storing large quantities of data.

The file server 1020 may have a distributed architecture; for example, it may include separate N-blade (network blade) and D-blade (data blade) components (not shown). In such an embodiment, the N-blade is used to communicate with clients 1010, while the D-blade includes the file system functionality and is used to communicate with the storage subsystem 1040. Alternatively, the file server 820 may have an integrated architecture, where the network and data components are all contained in a single box or unit. The file server 1020 further may be coupled through a switching fabric to other similar storage systems (not shown) that have their own local storage subsystems. In this way, all of the storage subsystems can form a single storage pool, to which any client of any of the storage systems has access.

In one embodiment of the invention, the file server 1020 includes a storage volume with a file structure that survives flushing of data from memory, such as a flexible volume. In a mirroring process, the volume may be a source volume or a destination volume that is a mirror of the source volume. If the volume is a destination volume, then in an embodiment of the invention the file server 1020 uses the file structure of the volume to retain active data during mirroring processes.

Figure 11:
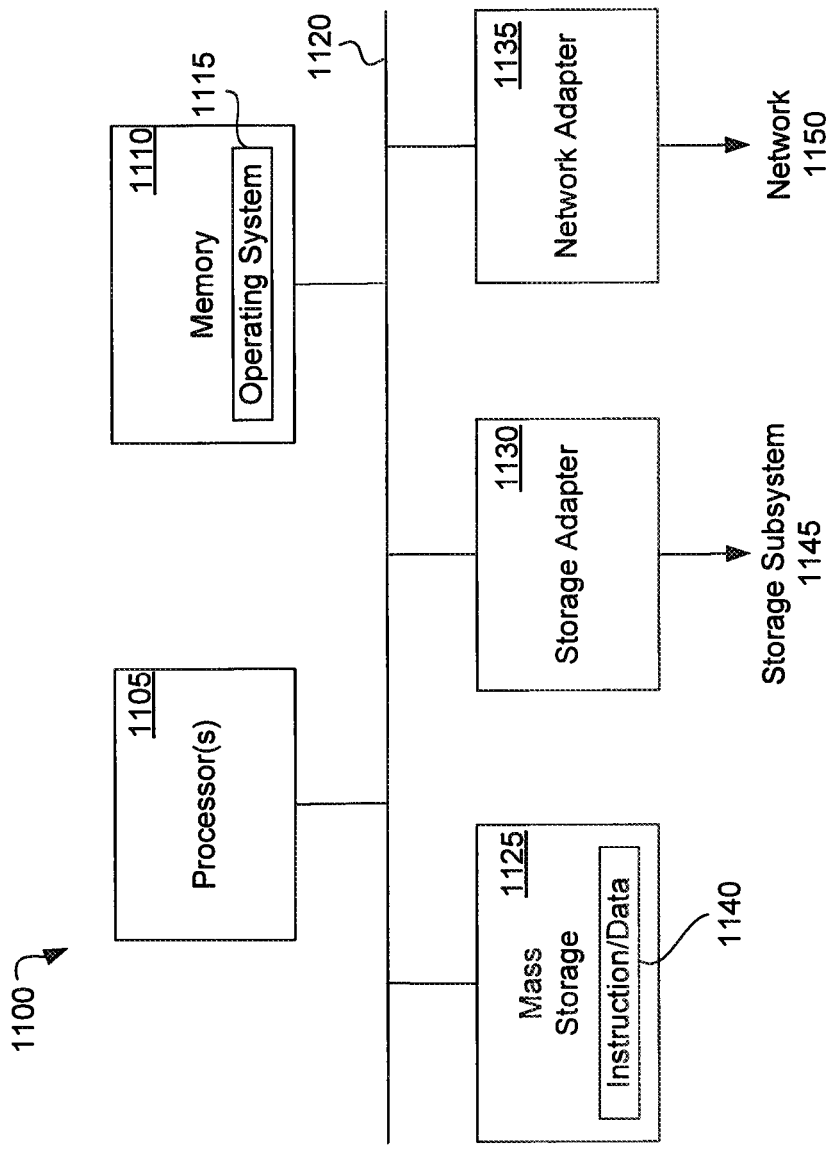
FIG. 11 is a block diagram illustrating an architecture of a file server that may include an embodiment of the invention.

FIG. 11 is a block diagram illustrating an architecture of a file server that may include an embodiment of the invention. Certain standard and well-known components that are not germane to the present invention are not shown. The file server 1100 includes one or more processors 1105 and memory 1110 coupled to a interconnect 1120. The interconnect 1120 shown in FIG. 11 is an abstraction that represents any one or more separate physical buses, point-to-point connections, or both connected by appropriate bridges, adapters, or controllers. The interconnect 1120, therefore, may include, for example, a system bus, a Peripheral Component Interconnect (PCI) bus, a HyperTransport or industry standard architecture (ISA) bus, a small computer system interface (SCSI) bus, a universal serial bus (USB), 11C (12C) bus, or an Institute of Electrical and Electronics Engineers (IEEE) standard 1394 bus, sometimes referred to as "Firewire". ("Standard for a High Performance Serial Bus" 1394-1995. IEEE, published Aug. 30, 1996, and supplements)

The processors 1105 are the central processing units (CPUs) of the file server 1100 and, thus, control the overall operation of the file server 1100. In certain embodiments, the processors 1105 accomplish this by executing software stored in memory 1110. A processor 1105 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 1110 is or includes the main memory of the file server 1100. Memory 1110 represents any form of random access memory (RAM), read-only memory (ROM), flash memory, or the like, or a combination of such devices. Memory 1110 stores, among other things, the operating system 1115 of the file server 1100.

Also connected to the processors 1105 through the interconnect 920 may be one or more internal mass storage devices 1125, a storage adapter 1130 and a network adapter 1135. Internal mass storage devices 1125 may be or include any conventional medium for storing large volumes of instructions and data 1140 in a non-volatile manner, such as one or more magnetic or optical based disks. The storage adapter 1130 allows the file server 1100 to access a storage subsystem 1145 and may be, for example, a Fibre Channel adapter or a SCSI adapter. The storage adapter 1130 may interface with a D-blade portion of the file server. The network adapter 1135 provides the file server 1100 with the ability to communicate with remote deices, such as clients, over a network 1150 and may be, for example, an Ethernet adapter. The network adapter 1135 may interface with an N-blade portion of the file server 1100.

In an embodiment of the invention, the file server 1100 may include a volume for which a data image is created, including the creation of a snapshot or clone. In one embodiment, the file server 1100 may include a volume representing either a source volume that is being mirrored or a destination volume that is a mirror of the source volume. The file structure for the volume is stored in memory 1110. The file structure may include a container file. In an embodiment of the invention, the file server uses the container file to prevent active data in memory 1110 from being deleted, such as in a mirroring process.

Figure 12:
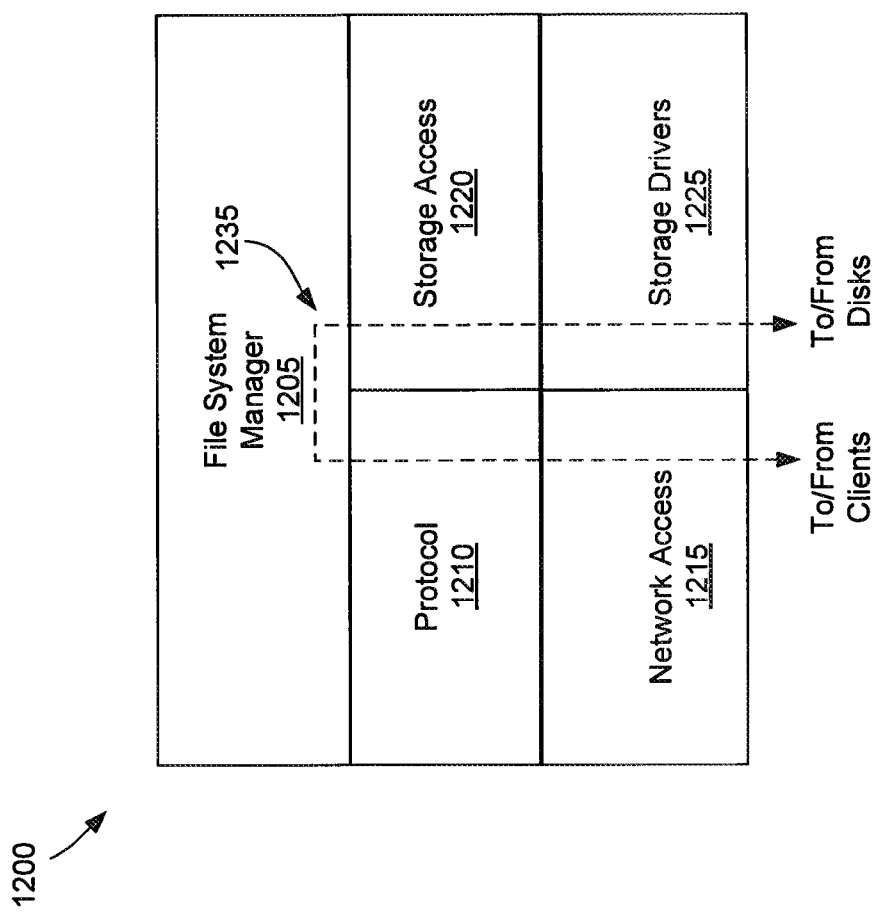
FIG. 12 illustrates an example of an operating system of a file server according to an embodiment of the invention.

FIG. 12 illustrates an example of the operating system of a file server according to an embodiment of the invention. As shown, the operating system 1200 includes several modules, or "layers". These layers include a file system manager 1205. The file system manager 1205 is software that keeps track of the directory structure (hierarchy) of the data stored in a storage subsystem and manages read/write operations on the data (i.e., executes read/write operations on the disks in response to client requests). The operating system 1200 also includes a protocol layer 1210 and an associated network access layer 1215, to allow a file server to communicate over a network to other systems, such as clients. The protocol 1210 layer implements one or more of various higher-level network protocols, such as Network File System (NFS), Common Internet File System (CIFS), Hypertext Transfer Protocol (HTTP) and/or Transmission Control Protocol/Internet Protocol (TCP/IP). The network access layer 1015 includes one or more drivers, which implement one or more lower-level protocols to communicate over the network, such as Ethernet. Interactions between clients and mass storage devices (for example, disks) are illustrated schematically as path 1235, which illustrates the flow of data through the operating system 1200.

The operating system 1200 further includes a storage access layer 1220 and an associated storage driver layer 1225 to allow a file server to communicate with a storage subsystem. The storage access layer 1220 implements a higher-level disk storage protocol, such as RAID, while the storage driver layer 1225 implements a lower-level storage device access protocol, such as Fibre Channel Protocol (FCP) or SCSI. To facilitate description, it is henceforth assumed herein that the storage access layer 1020 implements a RAID protocol, such as RAID-4 or RAID-DP™ (RAID double parity for data protection provided by Network Appliance, Inc.), and therefore may alternatively be referred to as RAID layer 1220.

In one embodiment of the invention, the operating system enables the mirroring of data to retain active data by storing such data in the container file of a destination volume and retaining such data in the process of unmounting and remounting the volume upon mirror update. In other embodiments of the invention, the operating system enables the retention of data related to creation of data images of a volume by storing such data in the container file of the volume.

Thus, a method and apparatus for caching of data requests in a session-based environment have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:

in response to receiving a mirror update to a second storage volume from a first storage volume to mirror a change in a first storage server,
storing, by a destination storage server, active data from a first location in a memory of the destination storage server to a second location in the memory, wherein the first location is in a data cache that stores cached data elements of a storage device of the destination storage server, and wherein the second location stores a metadata structure indexing the data elements of the second storage volume, and
unmounting the second storage volume to perform the mirror update, wherein the unmounting invalidates the active data at the first location due to its inclusion in the data cache but does not invalidate the metadata structure stored at the second location; and
providing a requested data element to a client upon request, wherein providing the requested data element comprises:
checking the metadata structure in the memory for the requested data element when the requested data element is not found in the data cache of the memory, and
when the requested data element is in the metadata structure, copying the requested data element to a third location in the memory that is part of the data cache from the metadata structure to make the requested data element available for the client.

2. The method of claim 1, wherein the metadata structure is a buffer tree of a container file of the second storage volume.

3. The method of claim 2, wherein buffer tree is hierarchical and comprises a set of one or more indirect blocks.

4. The method of claim 1, wherein providing the requested data element further comprises:
when the requested data element is not in the metadata structure, retrieving the requested data element to the third location in the data cache of the memory from the storage device to make the requested data element available for the client.

5. A non-transitory computer-readable storage medium comprising executable instructions to cause a processor to perform operations comprising:

in response to receiving a mirror update to a second storage volume from a first storage volume to mirror a change in a first storage server,
storing, by a destination storage server, active data from a first location in a memory of the destination storage server to a second location in the memory, wherein the first location is in a data cache that stores cached data elements of a storage device of the destination storage server, and wherein the second location stores a metadata structure indexing the data elements of the second storage volume, and
unmounting the second storage volume to perform the mirror update, wherein the unmounting invalidates the active data at the first location due to its inclusion in the data cache but does not invalidate the metadata structure stored at the second location; and
providing a requested data element to a client upon request, wherein providing the requested data element comprises:
checking the metadata structure in the memory for the requested data element when the requested data element is not found in the data cache of the memory; and
when the requested data element is in the metadata structure, copying the requested data element to a third location in the memory that is part of the data cache from the metadata structure to make the requested data element available for the client.

6. The non-transitory computer-readable storage medium of claim 5, wherein the metadata structure is a buffer tree of a container file of the second storage volume.

7. The non-transitory computer-readable storage medium of claim 6, wherein buffer tree is hierarchical and comprises a set of one or more indirect blocks.

8. The non-transitory computer-readable storage medium of claim 5, wherein providing the requested data element further comprises:
when the requested data element is not in the metadata structure, retrieving the requested data element to the third location in the data cache of the memory from the storage device to make the requested data element available for the client.

9. An active data retention system comprising:
a first storage server having a first storage volume for a first disk storage; and
a destination storage server including a second storage volume for a second disk storage, the second storage volume being a mirror of the first storage volume, wherein the destination storage server:
stores, in response to receiving a mirror update to the second storage volume from the first storage volume to mirror a change in the first storage server, active data from a first location in a memory of the destination storage server to a second location in the memory, wherein the first location is in a data cache that stores cached data elements of a storage device of the destination storage server, and wherein the second location stores a metadata structure indexing the data elements of the second storage volume;
unmounts the second storage volume to perform the mirror update, wherein the unmounting invalidates the active data at the first location due to its inclusion in the data cache but does not invalidate the metadata structure stored at the second location; and
provides a requested data element to a client upon request, wherein provides the requested data element comprises:
checks the metadata structure in the memory for the requested data element when the requested data element is not found in the data cache of the memory; and
when the requested data element is in the metadata structure, copies the requested data element to a third location in memory that is part of the data cache from the metadata structure to make the requested data element available for the client.

10. The active data retention system of claim 9, wherein the metadata structure is a buffer tree of a container file of the second storage volume.

11. The active data retention system of claim 10, wherein buffer tree is hierarchical and comprises a set of one or more indirect blocks.

12. The active data retention system of claim 9, wherein the destination storage server further provides the requested data element by:
when the requested data element is not in the metadata structure, retrieving the requested data element to the third location in the data cache of the memory from the storage device to make the requested data element available for the client.

13. A system comprising:
a processor coupled to a memory through a bus, wherein the memory comprises a data cache and a metadata structure, wherein the data cache caches data elements of a second storage device, and wherein the metadata structure indexes the data elements of a second storage volume stored on the second storage device;
an interface coupled to the processor through the bus to receive a mirror update from a first storage server having a first disk storage, the first disk storage comprising a first storage volume;
the second storage device coupled to the processor through the bus, the second storage device comprising the second storage volume that is a mirror of the first storage volume; and
a process executed from the memory by the processor to cause the processor to perform operations comprising:
in response to receiving the mirror update to the second storage volume from the first storage volume to mirror a change in the first storage server,
storing active data from a first location in the memory to a second location in the memory, wherein the first location is in the data cache and wherein the second location is in the metadata structure, and
unmounting the second storage volume to perform the mirror update, wherein the unmounting invalidates the active data at the first location due to its inclusion in the data cache but does not invalidate the metadata structure stored at the second location, and
providing a requested data element to a client upon request, wherein providing the requested data element comprises:
checking the metadata structure in the memory for the requested data element when the requested data element is not found in the data cache of the memory, and
when the requested data element is in the metadata structure, copying the requested data element to a third location in the memory that is part of the data cache from the metadata structure to make the requested data element available for the client.

14. The system of claim 13, wherein the metadata structure is a buffer tree of a container file of the second storage volume.

15. The system of claim 14, wherein buffer tree is hierarchical and comprises a set of one or more indirect blocks.

16. The system of claim 13, wherein providing the requested data element further comprises:
when the requested data element is not in the metadata structure, retrieving the requested data element to the third location in the data cache of the memory from the second storage device to make the requested data element available for the client.

* * * * *